United States Patent [19]
Griffin et al.

[11] Patent Number: 6,006,216
[45] Date of Patent: Dec. 21, 1999

[54] DATA ARCHITECTURE FOR FETCH-INTENSIVE DATABASE APPLICATIONS

[75] Inventors: Timothy G. Griffin, Berkeley Heights; Richard Baxter Hull, Morristown; Bharat Kumar, Scotch Plains; Daniel Francis Lieuwen, Plainfield; Gang Zhou, Bedminster, all of N.J.

[73] Assignee: Lucent Technologies Inc., Murray Hill, N.J.

[21] Appl. No.: 08/902,447

[22] Filed: Jul. 29, 1997

[51] Int. Cl.$^6$ ...................................................... G06F 17/30
[52] U.S. Cl. .................................. 707/2; 707/104
[58] Field of Search ................... 707/2, 4, 101, 707/104

[56] References Cited

U.S. PATENT DOCUMENTS

| | | | |
|---|---|---|---|
| 5,276,870 | 1/1994 | Shan et al. .................................. | 707/2 |
| 5,317,731 | 5/1994 | Dias et al. .................................. | 707/8 |
| 5,535,385 | 7/1996 | Griffin et al. .............................. | 707/3 |
| 5,758,149 | 5/1998 | Bierma et al. .............................. | 707/8 |

OTHER PUBLICATIONS

J.A. Blakeley, P.A. Larson, and F.W. Tompa. Efficiently updating materialized views. In Proc. ACM SIGMOD Symp. on the Management of Data, pp. 61–71, 1986.

S. Ceri and J. Widom. Deriving production rules for incremental view maintenance. In Proc. of Intl. Conf. on Very Large Data Bases, pp. 577–589, 1991.

T. Griffin and L. Libkin. Incremental maintenance of views with duplicates. In Proc. ACM SIGMOD Symp. on the Management of Data, pp. 328–339, 1995.

A. Gupta, I.S. Mumick, and V.S. Subrahamanian. Maintaining views incrementally. In Proc. ACM SIGMOD Symp. on the Management of Data, pp. 157–166, 1993.

W.H. Inmon and C. Kelley. Rdb/VMS: Developing the Data Warehouse. QED Publishing Group, Boston, Massachusetts, 1993.

Y. Zhuge, H. Garcia–Molina, J. Hammer, and J. Widom. View maintenance in a warehousing environment. In Proc. ACM SIGMOD Symp. on the Management of Data, pp. 316–327. San Jose, California, May 1995.

G. Zhou, R. Hull, and R. King. Generating data integration mediators that use materialization. Journal of Intelligent Information Systems. 6(2/3): 199–221, May 1996.

*Primary Examiner*—Wayne Amsbury
*Assistant Examiner*—John C. Loomis
*Attorney, Agent, or Firm*—Geraldine D. Monteleone; Jeffrey M. Weinick

[57] ABSTRACT

A logical data architecture for fetch-intensive database applications includes a first and a second logical database. The second database includes materialized views over the first database. Updates are propagated from the first database to the second database using so-called view maintenance techniques. In preferred embodiments, the first database may be optimized for update transactions and the second database may be optimized for read transactions. At least one of the materialized views included in the second database is based on a pre-defined application read transaction. The update processing overhead associated with view maintenance is substantially performed at the first database.

24 Claims, 5 Drawing Sheets

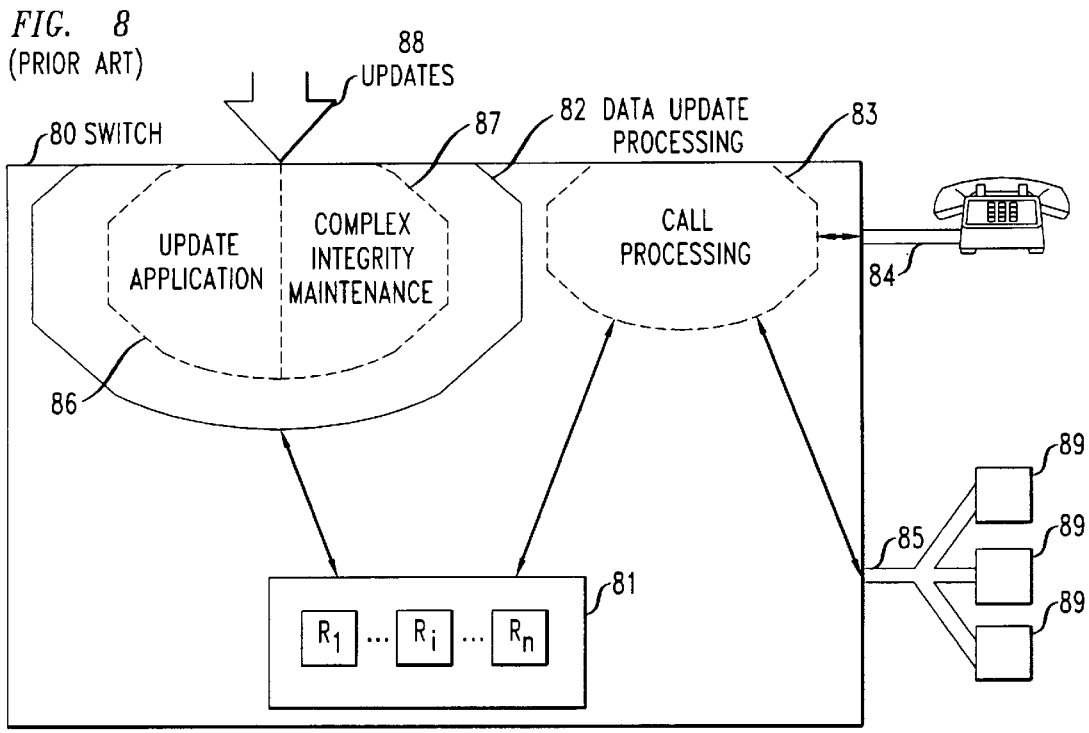
FIG. 8
(PRIOR ART)
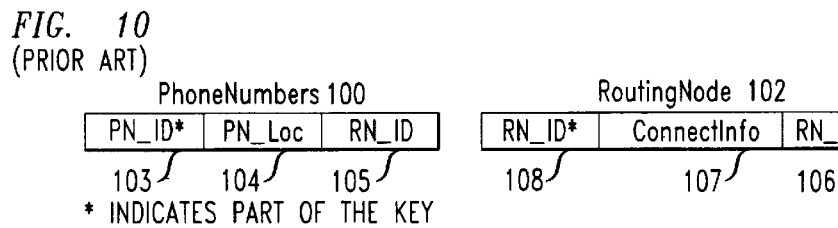
FIG. 10
(PRIOR ART)
FIG. 11
(PRIOR ART)
STANDARD CONSTRAINTS
(1) PhoneNumbers: key is PN_ID
(2) RoutingNodes: key is RN_ID
(3) PhoneNumbers[RN_ID] ⊆ RoutingNodes[RN_ID]
NON-STANDARD CONSTRAINTS
(4) The PN_Loc of a phone number is equal to the RN_Loc of the routing node assigned to that phone number
(5) Total number of PhoneNumbers for each routing node is ≤ 62
FIG. 12
(PRIOR ART)
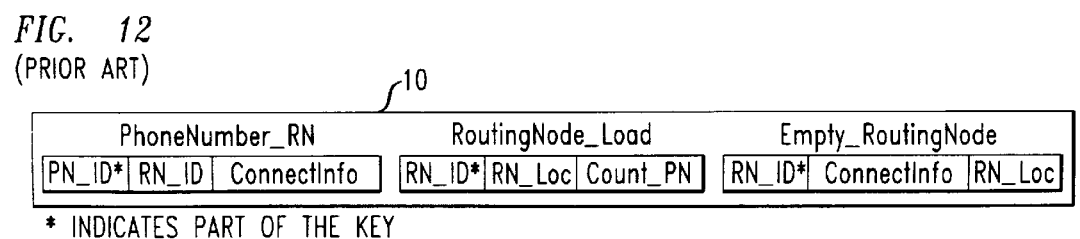
* INDICATES PART OF THE KEY

FIG. 13

STANDARD CONSTRAINTS
- (1) PhoneNumber_RN: key is PN_ID
- (2) RoutingNode_Load: key is RN_ID
- (3) Empty_RoutingNode: key is RN_ID
- (4) PhoneNumber_RN[RN_ID]⊆RoutingNode_Load[RN_ID]
- (5) $1 \leq \text{Count\_PN} \leq 62$ NON-STANDARD CONSTRAINTS
- (6) RoutingNode_Load[RN_ID]⊆PhoneNumber_RN[RN_ID]
- (7) (RoutingNode_Load[RN_ID]∩Empty_RoutingNode[RN_ID])=0
- (8) PhoneNumber_RN satisfies functional dependency RN_ID − ConnectInfo
- (9) for each RN_ID that occurs in PhoneNumber_RN, the count Count_PN in RoutingNode_Load is equal to the number of occurences of RN_ID in PhoneNumber_RN

FIG. 14

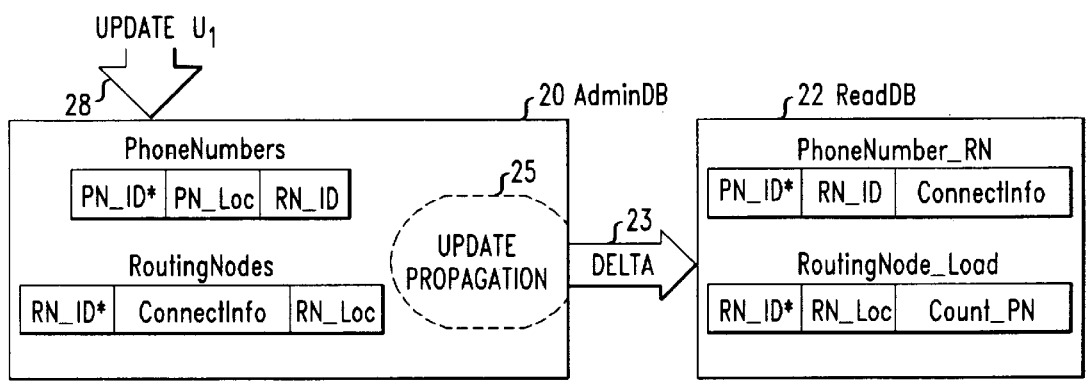

DATA ARCHITECTURE FOR FETCH-INTENSIVE DATABASE APPLICATIONS

FIELD OF THE INVENTION

The invention relates to data architecture, in particular logical data architecture for fetch-intensive database applications.

BACKGROUND OF THE INVENTION

Database applications can be loosely classified into categories depending on the applications' specific requirements—for example, whether an application requires fast query response time or efficient update processing. Each category of applications favors a different logical data organization and physical data distribution. Two examples are the so-called OLTP (On-Line Transaction Processing) and OLAP (On-Line Analysis Processing). For OLTP applications, a primary concern is high throughput for updates. In contrast, a primary concern for OLAP applications, which must deal with ad-hoc queries, is fast query response and high query throughput.

Another category of database applications that may be defined is referred to herein as "OLFP" (On-Line Fetch Processing). OLFP applications have the following characteristics: (1) most transactions (e.g., approximately 80% or more) are read-only; (2) most of the read-only transactions (e.g., approximately 80% or more) access data using key-based selections (referred to as "data fetching"); and (3) substantially all transactions are defined at system design time, as opposed to being ad hoc. Generally, OLFP transactions require very high throughput (for example, supporting hundreds of concurrent read transactions per second) and very short query response time, usually less than 500 milliseconds.

OLFP applications particularly arise in telecommunications, automated control systems, on-line financial transactions, and many embedded real-time database applications. For instance, in telephone switches, most of the transactions are queries for call processing, since there are only a small number of updates to reflect changes in the telephone network, such as new routing information and changes to customers' features. Other examples of OLFP applications include Internet routers and on-line credit card purchase approval systems.

Currently, to meet real-time requirements, OLFP applications are served by a database organization in which data is typically highly redundant, aggregated and stored in main-memory data management systems to avoid disk latency. However, this organization negatively impacts update processing performance and results in significant increases in the complexity of the supporting software.

SUMMARY OF THE INVENTION

The present invention provides a data organization which can be utilized to better meet the specific requirements of fetch-intensive (OLFP) database applications. The term database used herein refers not only to the collection of information but also to database management software (e.g., software performing tasks related to creating and maintaining the information).

According to the principles of the invention, copies of OLFP application data are maintained in at least two logical databases. OLFP application update transactions are directed to the first logical database; OLFP application read transactions are directed to the second logical database. The second database includes so-called materialized views over the first database. The majority of updates to the second database are propagated from the first database to the second database using so-called view maintenance techniques. That is, the majority of updates to the second database are performed via at least one technique of view maintenance. As a result of maintaining the second database by the view maintenance technique(s), the data integrity of the second database is substantially maintained automatically.

The first database is preferably optimized for update transactions and the second database is optimized for read transactions. That is, the databases are such that a) if updates were to be performed to both databases, the majority of those update transactions would be performed more efficiently to the first database than to the second database, and b) if reads were to be performed from both databases, the majority of those read transactions would be performed more efficiently from the second database than from the first database. At least one of the materialized views included in the second database may be based on a pre-defined application read transaction.

In preferred embodiments, the processing for the propagation of updates to the second database, or the processing associated with computing updates to the views included in the second database, substantially occurs at the first database. This processing essentially results from the fact that occurrences of a data item are stored in two different logical databases (the first and second databases). Further, incremental view maintenance techniques may be used. For example, when the first database is updated, incremental "deltas" are generated for each materialized view in the second database which needs to be updated. These deltas are then communicated to the second database.

In one embodiment of the invention, the first database is substantially "normalized". That is, there are limited occurrences of a data item. It also may hold auxiliary relations (tables) to improve performance or be optimized for at least one application-specific update. The second database may be optimized for at least one application-specific read and may be highly "unnormalized" (i.e., having significant data redundancy) as compared to the first database. Alternatively stated, the first database is more normalized than the second database.

The first and second databases need not necessarily exist on the same platform. Thus the first database may be placed on a disk-based commercial database system, while only the second database, as in existing OLFP applications, may be stored in the main memory system for fast reads.

We have found that this invention is particularly advantageous to facilitate call processing and routing functions for telecommunications switches. Such switches are generally a collection of hardware and associated software that may support multimedia data, as well as the capability of performing call processing (including routing of phone calls and call message storage and retrieval). Typically, these switches contain highly unnormalized data schemas that are optimized for the queries made by call processing and routing applications. Although the use of unnormalized schemas solves the real-time (or near real-time) access problem, it introduces complex data integrity and software engineering problems. For example, currently for the 5ESS switch there are approximately 500,000 lines of program code defining data integrity constraints (i.e., rules for preventing changes that are inconsistent with some database property). In addition, these switches typically employ proprietary main-memory data management systems to avoid the disk latency associated with commercial database systems.

In contrast, in a system embodying the principles of the invention the number and complexity of data integrity constraints can be dramatically reduced because most of the complicated integrity constraints of the unnormalized second database can be enforced directly on the normalized first database using simple key and referential integrity constraints. In addition, the enforcement of integrity constraints of the second database is performed automatically by the view maintenance techniques. Moreover, since the normalized first database may be installed on a commercial database system (while leaving the unnormalized database in main memory for fast reads), much of the overhead associated with the propagation of updates to the second database is off-loaded onto the first database and the invention allows switch developers to take advantage of the huge commercial market of database tools.

Finally, existing application code based on an unnormalized schema of current systems would not be affected by the upgrade to the data organization provided by the invention.

BRIEF DESCRIPTION OF THE DRAWING

FIG. 8 illustrates a telecommunications switch in the prior art.

FIG. 10 shows a normalized relational schema used in the prior art to represent data underlying a sample telecommunications switch application.

FIG. 11 shows the integrity constraints that should be satisfied by data underlying a sample telecommunications switch application using a normalized relational schema.

FIG. 12 illustrates the database organization currently used in the art to support a sample telecommunications switch application.

FIG. 13 shows the integrity constraints that should be satisfied by data underlying a sample telecommunications switch application using the current approach in the art.

FIG. 14 illustrates an embodiment of the invention as applied to a sample telecommunications switch application.

DETAILED DESCRIPTION

Figure 1:
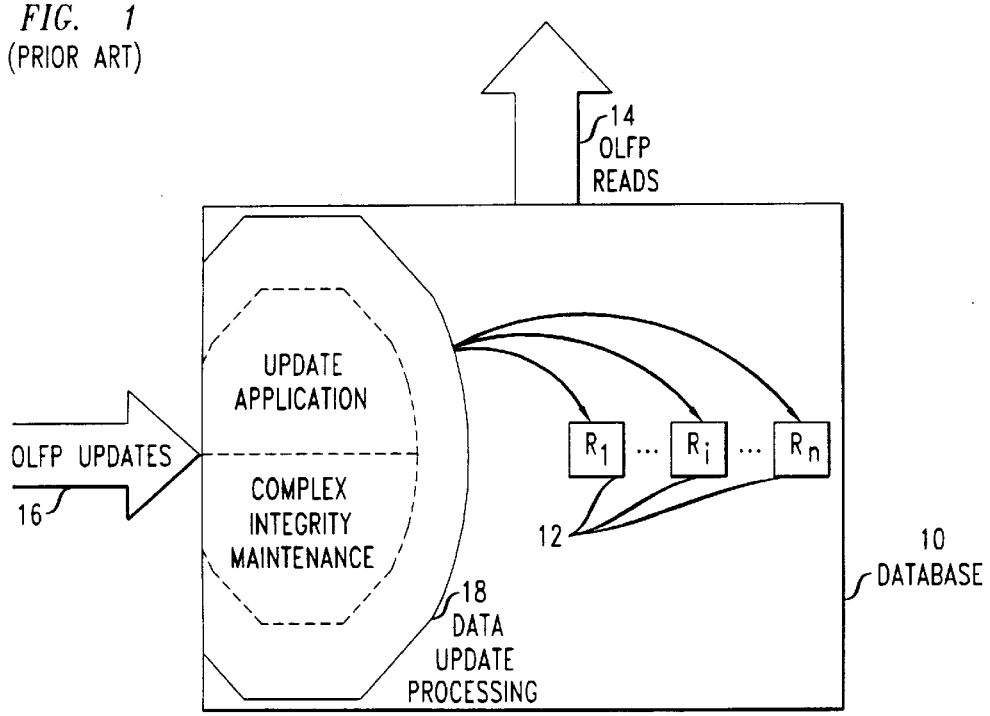
FIG. 1 illustrates a data organization known in the prior art.

Relational databases are well-known in the art. In a relational database, information is structured in tables, or relations, in which data values are stored in rows, or tuples, under various column headings. The information is retrieved by a query. A particular type of table is referred to as a "view," defined as a query over other so-called base tables. A view is either virtual or materialized depending on whether the view table is conceptual or an actual physical table containing the stored result of executing the view definition query. One example of when it would be beneficial to materialize a view, instead of recomputing the view when necessary, is when the view is used in the computation of a second view.

When information is specified to be updated, inserted or deleted from the database by a so-called transaction, a materialized view may need to be modified if changes are made to its base tables. There are several approaches to deal with this view maintenance requirement. For example, the view can be recomputed. Another technique is incremental view maintenance, an example of which is to propagate the changes made to the base tables by computing "delta queries" or "deltas" that can be applied directly to the materialized view. That is, both the transaction and the underlying view definition are analyzed to produce a delta specifying only the information needed to be modified in the view. Deltas may then either be applied to the view at the time of the transaction itself or may be batched together and applied at a later time.

The logical organization of data in a data management system includes both the choice of a schema and a choice of a logical architecture. The schema is the conceptual structure used to specify the organization of data for a specific application and is usually defined in terms of a general purpose data model, for example, the relational data model discussed above. In designing the database schema to be used in a specific database application, database application requirements—such as fast query response time, high query throughput and/or efficient update processing—need to be considered.

For example, one approach to provide fast query response time has been to use one database and duplicate data items. The duplication is both at the logical level (i.e., in the schema) and at the physical level (i.e., the same data item is stored simultaneously in multiple physical locations in memory). If, as the result of programming errors, this redundancy of data is not properly taken into account, update anomalies may result. That is, unless the occurrences of data redundancy are specifically noted and addressed, data may be updated in one place and not in another, causing inconsistencies and inaccuracies in processing. Therefore, there is a tradeoff in the design of database schemas between a) providing fast query processing by storing redundant data items, and b) avoiding potential update anomalies by storing each data item only once.

In a normalized database schema, there are few update anomalies and therefore data updating is facilitated. Typically, a normalized schema is obtained by first developing an abstract representation of the entities defined in the application and their relationships as they appear in the real world. This representation is then mapped into a relational database schema. In a normalized schema, occurrences of a particular data item are limited, usually resulting in a large number of "small-sized" relations, i.e., relations with relatively few columns. The small amount of data redundancy results in few opportunities for program code to fail to recognize and appropriately address potential update anomalies. However, due to the large number of relations, queries tend to be more complex (e.g., may require more so-called joins) and require more processing time than would have been necessary had there been fewer relations with more columns, as in an unnormalized schema.

Since unnormalized schemas usually result in relations with multiple occurrences of a data item, query response times for these schemas tend to be minimized. The relations tend to be "large-sized", i.e., have a large number of columns. This results in the elimination of the need for joins, or other processing such as aggregation, of any number of smaller-sized relations, which may be expensive in terms of CPU and I/O processing costs.

However, unnormalized schemas have performance and software engineering problems. For example, an unnormalized schema results in data redundancy wherein one logical update involves several physical updates. Update procedures may be coded to ensure that all occurrences of a modified data item were updated correctly, but these procedures are often costly in terms of CPU and I/O processing, labor intensive to code, and error-prone due to coding mistakes, i.e., program "bugs." As a result, integrity constraints need to be included to ensure data integrity. For a large schema with many tables, there may be an enormous number of constraints. Every update, even a relatively simple update, causes the checking of some or all of these constraints. This consumes CPU cycles and may sometimes involve such expensive database operations as a sequential table scan. Moreover, it is difficult to specify and maintain accurate and exhaustive integrity constraints.

Categories of database applications, for example OLTP and OLAP, may be defined depending on the applications' specific requirements. Each category of applications favors a different logical data organization and physical data distribution. For example, most OLTP applications address the tradeoff between avoiding update anomalies and providing fast query processing by using arrangements having little data redundancy.

In contrast, "data warehousing" may be the preferred logical architecture for OLAP applications. In data warehousing, information from one or more sources (typically databases used in OLTP applications) is extracted, integrated and stored in one single repository or "data warehouse". The data warehouse typically includes materialized views over the extracted information and is refreshed only on a periodic basis. As a result, the data warehouse may not be "current" because it may not contain the most recent information.

The data warehousing approach used for OLAP applications is problematic when directly applied to OLFP applications, where the tradeoff problem between avoiding update anomalies and providing fast query response and throughput is exacerbated. For example, data warehousing does not sufficiently address the data currency and the more stringent read-throughput requirements of OLFP. Indeed, some OLFP applications require guaranteed response time measured in milliseconds as compared to the less stringent OLAP response time requirements of seconds or even hours. Further, unlike data warehousing systems which support mostly ad hoc queries, OLFP applications support predefined queries for which databases could be better optimized.

Existing approaches to meet the real-time requirements of OLFP applications tend to prefer an unnormalized schema. In such approaches, data is typically highly redundant, aggregated and stored in main-memory data management systems to avoid disk latency. However, as with any unnormalized schema, there are the performance and software engineering problems described above.

FIG. 1 illustrates a logical data architecture utilized in the prior art for database applications with read transactions requiring extremely fast response times. Data in database 10 is structured in tables or relations 12 denoted as $R_1, \ldots R_j, \ldots R_n$. Generally, the data is modeled in a highly unnormalized schema that is optimized for read transactions 14, thereby avoiding the overhead associated with typical normalized schemas. For example, several tables that would occur in a normalized version of the schema are joined together in the unnormalized schema to form a large table. In this way, queries that would have involved joins of the smaller tables can benefit from the precomputation of the joins.

However, with such an architecture, update transactions 16 may become more difficult and expensive in terms of CPU and I/O processing costs. The data update processing 18 associated with update transactions 16 includes not only determining the relations 12 to be updated and updating the relations 12 accordingly, but also includes complex processing to maintain data integrity, e.g., the checking of integrity constraints.

Figure 2:
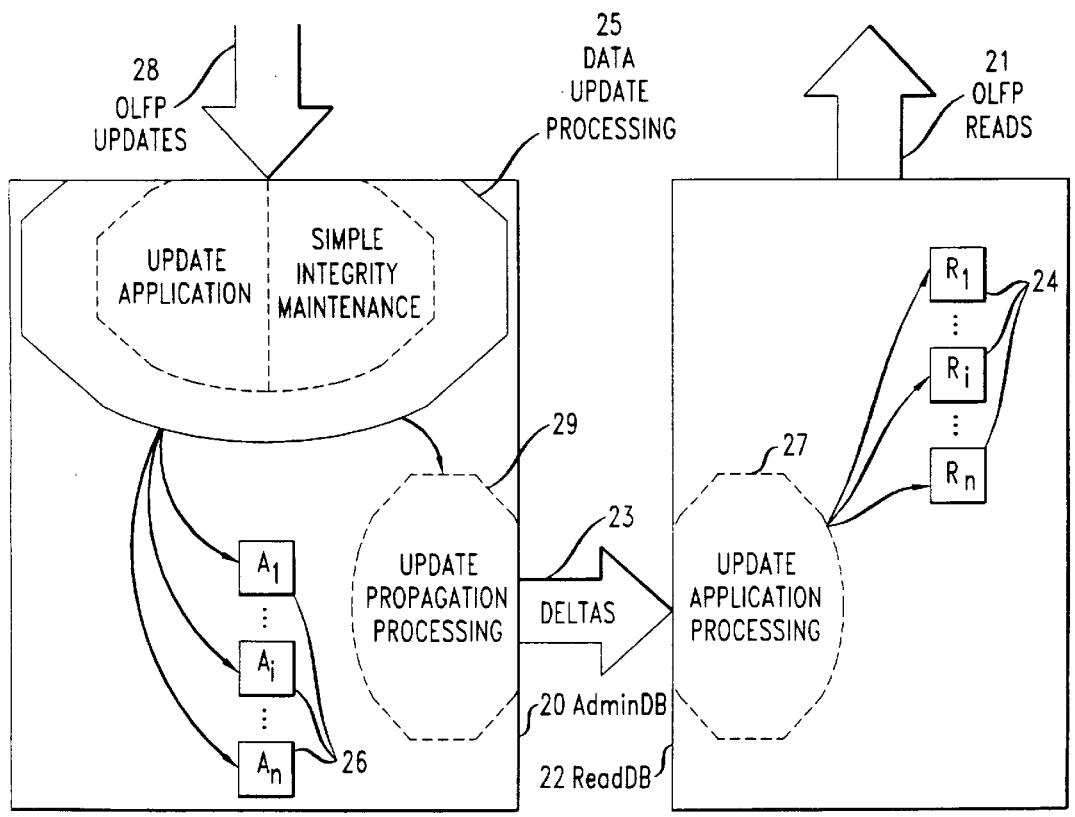
FIG. 2 illustrates an embodiment of the invention.

FIG. 2 illustrates an embodiment, according to the principles of the present invention of a logical data architecture that is specifically tailored to meet the requirements of OLFP applications. Two copies of the data are maintained. Application read transactions 21 are directed against one copy referred to herein as ReadDB 22; application update transactions 28 are directed against the other copy referred to herein as AdminDB 20. AdminDB 20 may be optimized for at least one application-specific update and other administrative functions. ReadDB 22 may be optimized for at least one application-specific read. Generally, the databases may be such that a) if updates were to be performed to both databases, the majority of the updates would be performed more efficiently to the AdminDB 20 than to the ReadDB 22, and b) if reads were to be performed from both databases, the majority of the reads would be performed more efficiently to the ReadDB 22. The optimization of the databases is illustrated in the telecommunications switch example provided below.

AdminDB 20 includes relations $A_1, \ldots A_i, \ldots A_n$ 26 and ReadDB 22 includes relations $R_1, \ldots R_i, \ldots R_n$ 24. In particular, each relation $R_i$ is defined as a materialized view over the relations 26 of the AdminDB. That is, the content of each ReadDB 22 relation is defined using a query over the AdminDB 20.

ReadDB 22 may be optimized for reads by utilizing an unnormalized schema and by holding the pre-computed answers to the set of reads or fetches (reads using key-based selection) 21 that are made by the application. AdminDB 20 may be optimized for updates by utilizing a normalized schema and by including optional auxiliary relations to improve performance. These auxiliary relations may include relations supporting certain parameterized updates, i.e., updates involving parameters to be supplied at execution time. Such relations may in fact be copies of relations defined in ReadDB 22. As in example, the update "delete the item with the highest price" would be facilitated by having an auxiliary relation holding the highest price for the items.

Data update processing 25 must be performed to apply updates 28 to the data in relations 26 of AdminDB 20. However, due to the normalized schema of AdminDB 20 and the fact that it is optimized for updates, the integrity maintenance processing is much simpler than the corresponding processing in the FIG. 1 arrangement.

The materialized views 24 of ReadDB 22 must be updated appropriately as updates 28 are made to the tables, or relations, 26 over which these views are defined. The processing 29 for the propagation to the relations in ReadDB 22 of the updates made to the base tables in AdminDB 20 may involve incremental view maintenance, for example, the generation of incremental deltas. The generation of deltas is preferably performed at the AdminDB 20. The deltas may be: (1) applied immediately; (2) deferred until a certain number of deltas accumulate or a period of time passes; or (3) batched together and applied at a predefined time. The deltas may be any of various different forms as in the prior art. They may, for example, indicate every tuple to be modified/inserted/deleted (a so-called "fat" delta) or merely indicate the relevant composite update in an abbreviated form (a so-called "skinny" delta). In the preferred embodiment, these deltas are generated automatically from the query language in the OLFP application specifying the update. (See T. Griffin and L. Libkin, "Incremental Maintenance of Views with Duplicates", *Proc. ACM SIGMOD Symp. on the Management of Data*, pp. 328–39, 1995.) The processing 27 at ReadDB 22 includes the application of deltas 23 directly to each materialized view in the second database which needs to be updated.

The logical data architecture provided by the invention offers significant performance gains over the prior art. Updates are facilitated by the normalized schema of AdminDB 20 because such a schema is based on a more natural presentation of the entities and their relationships in the real world. This results in the need for a relatively small number of fewer integrity constraints and greater ease of specification of any remaining constraints. Moreover, the added incremental view maintenance operations are significantly less expensive than the constraint checking. Reads are facilitated not only by the schema of ReadDB 22, but also because fewer CPU resources need to be diverted for updates.

Figure 3:
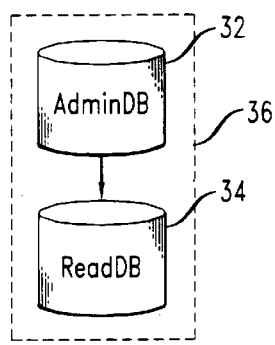
FIGS. 3–7 illustrate different embodiments of physical data distributions that can be employed in arrangements embodying the principles of the invention.

AdminDB 20 and ReadDB 22 are logical databases that may reside in one physical database or may be distributed over two or more physical databases. There are several physical architectures illustrated in FIGS. 3–7 that support the logical framework. As illustrated in FIG. 3, both an AdminDB 32 and a ReadDB 34 may reside on a single platform 36, i.e., on one computer system comprised of compatible hardware and software. This approach is useful if the performance requirements can be met by a single platform or if a second platform is not available.

Figure 4:
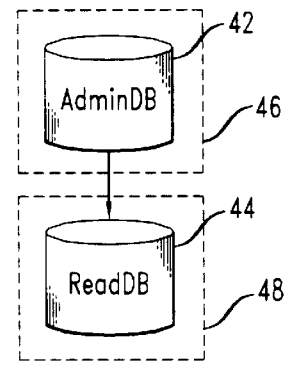

FIG. 4 illustrates a two-platform approach in which an AdminDB 42 and a ReadDB 44 reside on different platforms, platforms 46 and 48 respectively. This approach permits parallelism (e.g., simultaneous processing in both databases) and provides for the off-load of much of update processing from the platform supporting the read transactions critical to application processing.

Figure 5:
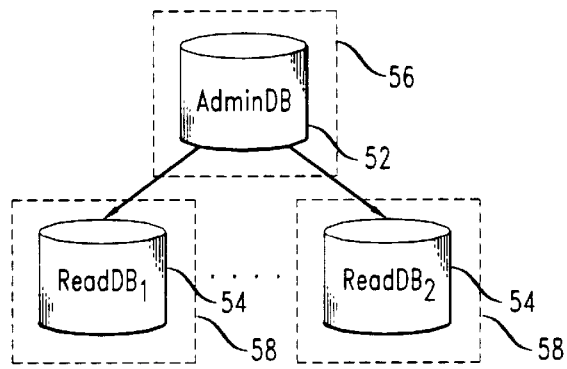

Finally, there are various multi-platform approaches. For example, an AdminDB 52 may reside on one platform 56 and a ReadDB 54 may be distributed across (or replicated on) several platforms 58, as illustrated in FIG. 5. This approach is used to distribute the read transactions and is particularly useful if the geographic location of the ReadDB platform is significant. The ReadDBs may hold identical data, overlapping data, or disjoint data, in which case the AdminDB must be arranged to keep track of where updates should be propagated to.

Figure 6:
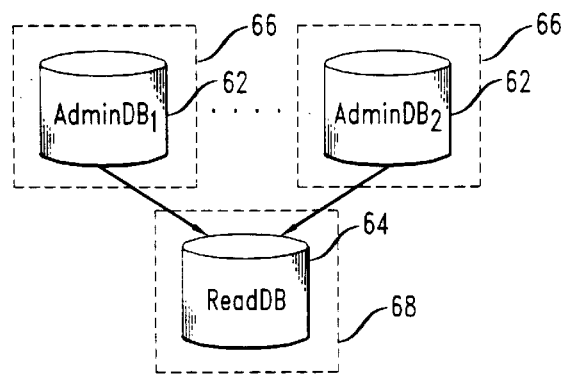
Figure 7:
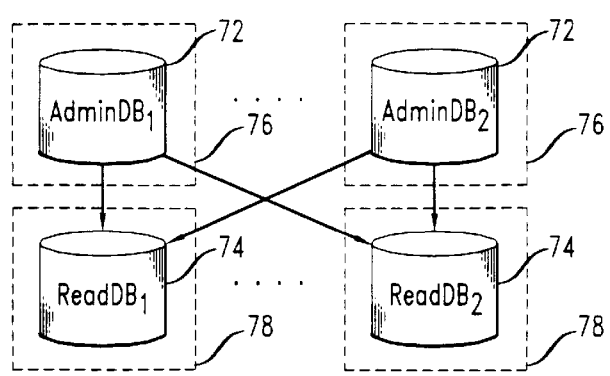

In another variation, a ReadDB 64 resides on one platform 68 and AdminDB 62 is distributed across several platforms 66, as illustrated in FIG. 6. FIG. 7 shows a combined multi-platform approach in which both a ReadDB 74 and an AdminDB 72 reside on several platforms 78 and 76 respectively.

However, multiple AdminDBs may cause problems. For example, update conflicts may occur if data is duplicated in two or more AdminDBs. This problem may be addressed either by prohibiting data replication among the AdminDBs or by implementing a conflict resolution protocol among the AdminDBs. The latter solution may slow down the update processing. Further, coordination among the AdminDBs would be required to propagate updates to the ReadDB. Prior art techniques may be utilized to facilitate this coordination.

The present data architecture has some similarity to the above-described technique of data warehousing in that they both call for an update-optimized database and a separate read-optimized database. However, as discussed above, the data warehousing approach, as currently used in the prior art, is problematic when directly applied to OLFP applications. Indeed, the existing approach to OLFP applications is not to use data warehousing at all, but instead to utilize one database with an unnormalized schema. Contrary to the teachings in the art, we have realized that arrangements embodying the principles of the invention, although somewhat similar at an abstract level to data warehousing, address the problems associated with using for (OLFP applications) either a data warehousing approach (as currently practiced in the art) or the existing one database approach. In particular, we have found that by, in essence, "inverting" the basic concept of the data warehousing approach and utilizing techniques, such as incremental view maintenance, that are thought to be inapplicable to current data warehousing applications, the resulting arrangements satisfy the requirements and optimization goals of an OLFP application.

For example, the roles of the read- and update-optimized databases in data organizations embodying the principles of the invention are inverted in typical data warehousing applications. In a data warehousing application, the update-optimized databases support the critical operational functions, while the warehouse database supports analysis functions. In contrast, the highly read-optimized database of the invention can advantageously hold the critical information necessary for most of the application processing, while the update-optimized database can efficiently process the infrequent update requests that would have otherwise potentially degraded overall system performance.

Further, the conventional technique of incremental view maintenance is not used in a data warehousing application because, among other reasons, the processing bottleneck in such an application occurs at the update-optimized database (s). Using incremental view maintenance in a data warehousing application would put additional load on the critical operational update-optimized databases by requiring them to frequently send update information to the warehouse. In contrast, the processing bottleneck for OLFP applications is usually at ReadDB. Therefore, in preferred embodiments of the invention, incremental view maintenance is substantially performed at the update-optimized AdminDB.

Moreover, the satisfaction of integrity constraints in the ReadDB is advantageously performed automatically and guaranteed by view maintenance techniques. On the other hand, the enforcement of integrity constraints in the read-optimized database is not important in a typical data warehousing application in which such view maintenance techniques are not utilized.

In addition, unlike typical data warehousing techniques, the data in ReadDB, kept current by view maintenance techniques, meets the OLFP requirements for freshness. OLFP applications require that updates at the AdminDB be propagated relatively quickly to the ReadDB, while the data in most warehouses may potentially be days or weeks out-of-date. As a result, fast view maintenance is needed for OLFP, whereas periodic refresh of the warehouse is sufficient for most OLAP applications.

Finally, by taking advantage of the fact that OLFP applications have a set of pre-defined queries, the read response time for an OLFP application can be significantly improved over that offered by a warehousing system by optimizing the ReadDB for these known queries. For example, the ReadDB may hold pre-computed answers to these queries.

We have found the invention to be particularly advantageous in facilitating call processing and routing functions in telecommunications switches. FIG. 8 illustrates a highly conceptualized view of a telecommunications switch 80 in the prior art. Switch 80 includes data stored in relations $R_1$ to $R_n$ 81 and processing units to perform data update 82 and to perform call processing 83. Call processing unit 83 handles voice and routing data information for telephone lines 84 and trunks 85 (leading to other switches 89). Data update processing unit 82 includes update application processing 86, i.e., the application of incoming updates 88 to the data stored in relations 81. It also includes complex integrity maintenance processing 87, e.g., the checking of integrity constraints to ensure data integrity.

Figure 9:
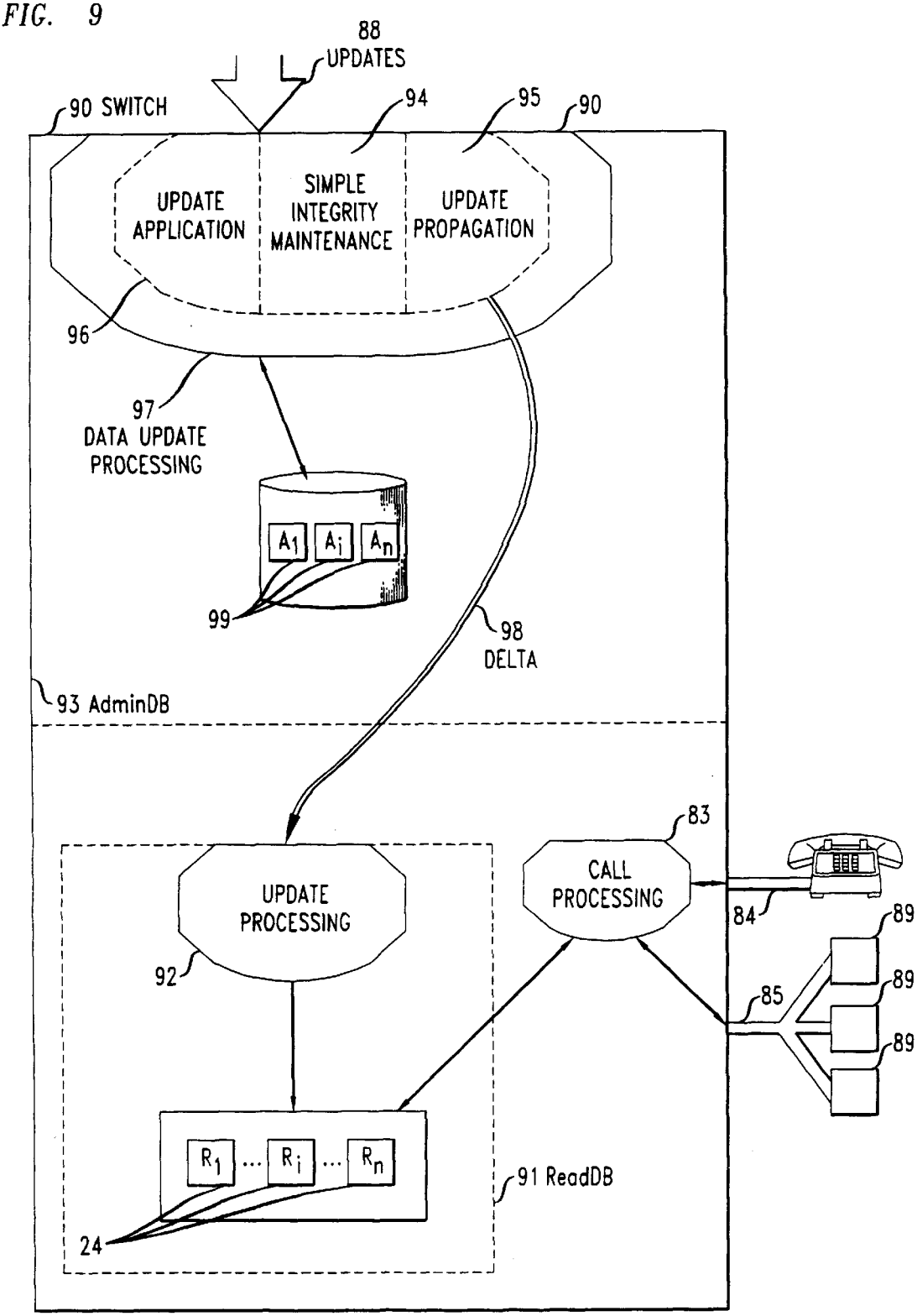
FIG. 9 illustrates a telecommunications switch embodying the principles of the invention.

FIG. 9 illustrates one embodiment of the invention as applied to a telecommunications switch. Telecommunications switch 90 includes ReadDB 91 in which data is stored in relations $R_1$ to $R_n$ 24. This data is accessed by call processing unit 83 which, as in FIG. 8, interacts with telephone lines 84 and trunks 85 connected to other switches 89. Application updates 88 are directed to AdminDB 93 in which a second copy of the data is stored in relations $A_1$ to $A_n$ 99. Data update processing unit 97 is composed of: 1) update application processing 96 to apply the update to data stored in relations 99; 2) simple integrity maintenance processing 94 to ensure data integrity in AdminDB 93; and 3) update propagation processing 95 to propagate the update to ReadDB 91. The update propagation processing 95 includes the view maintenance techniques necessary to meet the stringent data currency requirements of ReadDB 91 (e.g., the generation of a delta 98). Update processing unit 92 involves the application of the view maintenance technique (e.g., the application of the delta 98 to relations 24).

Integrity maintenance processing 94 is much simpler than integrity maintenance processing 87 in FIG. 8 for at least two reasons. For example, due to the preferred normalized schema of AdminDB 93 there are fewer and less complex integrity constraints which need to be satisfied in processing an update. Further, the integrity of ReadDB 91 is automatically performed by the view maintenance techniques.

The following telecommunications switch application illustrates the invention in greater detail. A normalized relational schema representing the data underlying this application is shown in FIG. 10. Information about phone numbers is stored in a table named PhoneNumbers 100 and information about routers is stored in a table named RoutingNodes 102. Each phone number (stored in field PN-ID 103) has a location (e.g., a city block, stored in field PN_Loc 104) and is assigned to a single routing node (stored in fields RN_ID 105 and RN_ID 108). Routing nodes also have locations (stored in field RN-Loc 106). For each location, there may be one or more routing nodes. Phone numbers can be assigned only to routing nodes having the same location. Information about how a phone call from a given phone number should be routed in stored in field ConnectInfo 107. The asterik indicates which fields are part of the key to access the tables.

Integrity constraints that the data should satisfy are shown in FIG. 11. The standard constraints labeled 1–3 are typically provided for by most commercial database management systems. Specific program code is required to enforce the non-standard constraints labeled 4–5. The standard constraints include key dependencies and key-based referential integrity constraints.

Two key-based queries (or fetches) Q1 and Q2 must be supported by this telecommunications switch application:

```
Q1(phone_num) =   SELECT     RN_ID, ConnectInfo
                  FROM       PhoneNumbers, RoutingNodes
                  WHERE      PhoneNumbers.RN_ID=RoutingNodes.RN_ID
                             AND PN_ID =phone_num
Q2(route_node) =  SELECT     RoutingNodes.RN_ID, RN_Loc, COUNT (PN_ID) AS
                             Count_PN
                  FROM       PhoneNumbers, RoutingNodes
                  WUERE      PhoneNumbers.RN_ID=RoutingNodes.RN_ID
                             AND RoutingNodes.RN_ID = route_node
                  GROUP BY   RoutingNodes.RN_ID
```

Q1 returns the ConnectInfo for a given phone number (phone_num). Q2 returns the location and number of phone numbers associated for a given routing node (route_node).

An update that must be supported by this application includes U1(phone_num, location) which will add a given phone number (phone_num) that is in a given location (location). Update U1 will also connect phone_num to one of the minimally loaded routing nodes that is also in that location.

The current approach to support such a switch application is to utilize one database, as illustrated in FIG. 12, which is optimized to provide fast support for queries Q1 and Q2. Database 10 includes relations PhoneNumber_RN, RoutingNode_Load and Empty_RoutingNode to support Q1, Q2, and U1, respectively. Relation Empty_RoutingNode holds information about routing n odes for which no phone number is currently assigned.

There is substantial redundancy in this schema, and it is not in normal form. In particular, FIG. 13 shows the integrity constraints that should be satisfied by data in this schema. The number of standard constraints is almost double the number for the above-described normalized schema, and the number of non-standard constraints is double. In practice, the increase in the number of integrity constraints is typically much higher.

FIG. 14 illustrates an embodiment of the invention as applied to this switch application. The normalized schema described above may be used for AdminDB 20. That is, AdminDB 20 includes tables PhoneNumbers 26 and RoutingNodes 27. Using this normalized schema optimizes AdminDB 20 for updates, in particular, update U1. ReadDB 22 includes two materialized views which correspond to relations of the current approach, PhoneNumber_RN 24 and RoutingNode_load 25, defined as:

CREATE MATERIALIZED VIEW PhoneNumber_RN
      AS
      SELECT PN_ID, RoutingNodes.RN_ID, ConnectInfo
      FROM PhoneNumbers, RoutingNodes
      WHERE            PhoneNumbers.RN_ID = RoutingNodes.RN_ID
    CREATE MATERIALIZED VIEW RoutingNode_Load
      AS

```
SELECT RoutingNodes.RN_ID, RN_Loc, COUNT
   (PN_ID) AS Count_pn
FROM PhoneNumbers, RoutingNodes
WHERE         PhoneNumbers.RN_ID =
   RoutingNodes.RN_ID
GROUPBY RoutingNodes.RN_ID
```

Including these views, which hold the precomputed answers to Q1 and Q2, optimizes ReadDB for reads, in particular, queries Q1 and Q2. This illustrates the aforementioned optimizations of AdminDB and ReadDB for application-specific updates and reads.

Update U1 (pn, loc) 28, where pn and loc represent specific values, is directed against AdminDB 20. Existing application program code finds an appropriate routing node for phone number pn with location loc, namely, rn. The ConnectInfo for routing node rn is ConnInf. AdminDB 20 is updated by inserting the tuple or row (pn, loc, rn) into the table PhoneNumbers. Using prior art techniques, a delta 23 for ReadDB 22 will be computed 25 at the AdminDB 20 using pn, rn, and ConnInf. This delta will then be applied to ReadDB (or transmitted, if AdminDB 20 and ReadDB 22 are on separate platforms). As in the prior art, the program code supporting this propagation of update U1 to ReadDB can be automatically generated.

The delta may indicate the tuples that are to be inserted and/or deleted from the relations in ReadDB, for example,

```
Δ =    {+PhoneNumber_RN (pn,rn,ConnInf),
        -RoutingNode_Load(rn, loc, count),
        +RoutingNode_Load(rn,loc,count+1) },
``` or the delta may indicate the relevant change to RoutingNode_Load by showing that the attribute of the rn tuple is to be incremented, for example,

```
Δ={+PhoneNumber_RN (pn,rn,ConnInf), mod
   RoutingNode_Load(rn: mod Count_PN (+1))}
```

Benchmarking results have indicated that the cost of updates to ReadDB in terms of processing time as compared to the cost of updating in existing switch systems was dramatically reduced under a variety of data and load distributions by use of the invention, in one case by as much as about 84%. In addition, the cost of developing application program code to perform updates is lowered because the number of integrity constraints used in the normalized schema of AdminDB 20 is less than the number of integrity constraints used in the current approach. Finally, providing a modularized perspective of the data processing software by separating the normalized schema of the data (AdminDB 20) from the read-optimized schema (ReadDB 22) can be beneficial for large applications.

The foregoing merely illustrates the principles of the invention. For example, although the invention is applied in the present disclosure to a relational database architecture in which data is stored in tables, it applies also to other types of database architectures which may support its features, such as object-oriented, hierarchical, network or proprietary architectures. It will thus be appreciated that those skilled in the art will be able to devise numerous and various alternative arrangements which, although not explicitly shown or described herein, embody the principles of the invention and are within its spirit and scope.

We claim:

1. A method of operation of an on-line fetch processing application, said method comprising directing a majority of updates to a first database, directing a majority of reads to a second database, said first and second databases being such that said majority of updates are performed more efficiently to said first database than they would be if said updates were to be performed to said second database, and said majority of reads are performed more efficiently from said second database than they would be if said reads were to be performed from said first database, said second database holding materialized views, said materialized views being based on said first database, and substantially maintaining said second database by at least one technique of view maintenance.

2. The method of claim 1 wherein at least one of said materialized views is based on at least one application-specific read.

3. The method of claim 1 wherein at least one of said techniques of view maintenance is a technique of incremental view maintenance.

4. The method of claim 1 wherein update processing associated with occurrences of a data item in both said first and said second databases occurs substantially at the first database.

5. The method of claim 1 wherein said on-line fetch processing application being such that:

a) most transactions are read-only;

b) most of the read-only transactions use key-based selections; and c) substantially all transactions are defined at system design time.

6. An apparatus comprising a first database; and a second database including materialized views over said first database, said first and second databases being such that a majority of updates are performed more efficiently to said first database than they would be if said updates were to be performed to said second database, and a majority of reads are performed more efficiently from said second database than they would be if said reads were to be performed from said first database, at least one of said materialized views being based on at least one read specific to an application, said application being an on-line fetch processing application such that:

a) most transactions are read-only;

b) most of the read-only transactions use key-based selections and c) substantially all transactions are defined at system design time;

wherein a majority of updates to said second database are performed via at least one technique of view maintenance.

7. The apparatus of claim 6 wherein processing associated with said view maintenance is substantially performed at said first database.

8. The apparatus of claim 6 wherein said apparatus is a telecommunications switch.

9. The apparatus of claim 6 wherein said technique of view maintenance is a technique of incremental view maintenance.

10. The apparatus of claim 9 wherein said technique of incremental view maintenance includes communication of at least one delta to said second database.

11. The apparatus of claim 6 wherein either or both of said first and said second databases are physically distributed across platforms.

12. The apparatus of claim 6 wherein both of said first and said second databases reside on the same platform.

13. The apparatus of claim 6 wherein said first database is more normalized than said second database.

14. The apparatus of claim 6 wherein said first database is optimized for at least one application-specific update.

15. An apparatus comprising a first database structured so as to optimize at least one update specific to an application, said application being an on-line fetch processing application; and a second database having materialized views, said views being based on said first database, said second database being defined so as to optimize at least one read specific to said application, said second database being maintained by at least one technique of incremental view maintenance.

16. The apparatus of claim 15 wherein said first database includes means for computing updates to said materialized views and for applying them to said second database.

17. The apparatus of claim 15 wherein the first and second databases are such that a majority of updates is performed more efficiently to said first database than they would be if said updates were to be performed to said second database, and a majority of reads is performed more efficiently from said second database than they would be if said reads were to be performed from said first database.

18. The apparatus of claim 15 wherein said o n-line fetch processing application being such that:

a) most transactions are read-only;

b) most of the read-only transactions use key-based selections; and c) substantially all transactions are defined at system design time.

19. A telecommunications switch comprising a first database; and a second database including materialized views over said first database, wherein a majority of updates to said second database are performed via at least one technique of view maintenance.

20. The switch of claim 19 wherein said first database includes means for computing updates to said materialized views and for applying them to said second database.

21. The switch of claim 19 wherein said second database is defined using at least one application-specific query over said first database.

22. The invention of claim 19 wherein said first and second databases being such that a majority of updates are performed more efficiently to said first database than they would be if said updates were to be performed to said second database, and a majority of reads are performed more efficiently from said second database than they would be if said reads were to be performed from said first database.

23. The invention of claim 19 wherein said technique of view maintenance includes incremental view maintenance.

24. A telecommunications switch comprising a first database; and a second database including materialized views over said first database, the first and second databases being such that a majority of updates are performed more efficiently to said first database than they would be if said updates were to be performed to said second database, and a majority of reads are performed more efficiently from said second database than they would be if said reads were to be performed from said first database, at least one of said materialized views being based on at least one application-specific read;

wherein propagation of said majority of updates to said second database is performed via at least one technique of incremental view maintenance, the processing associated with said view maintenance being substantially performed at said first database.

* * * * *